Figure 5:
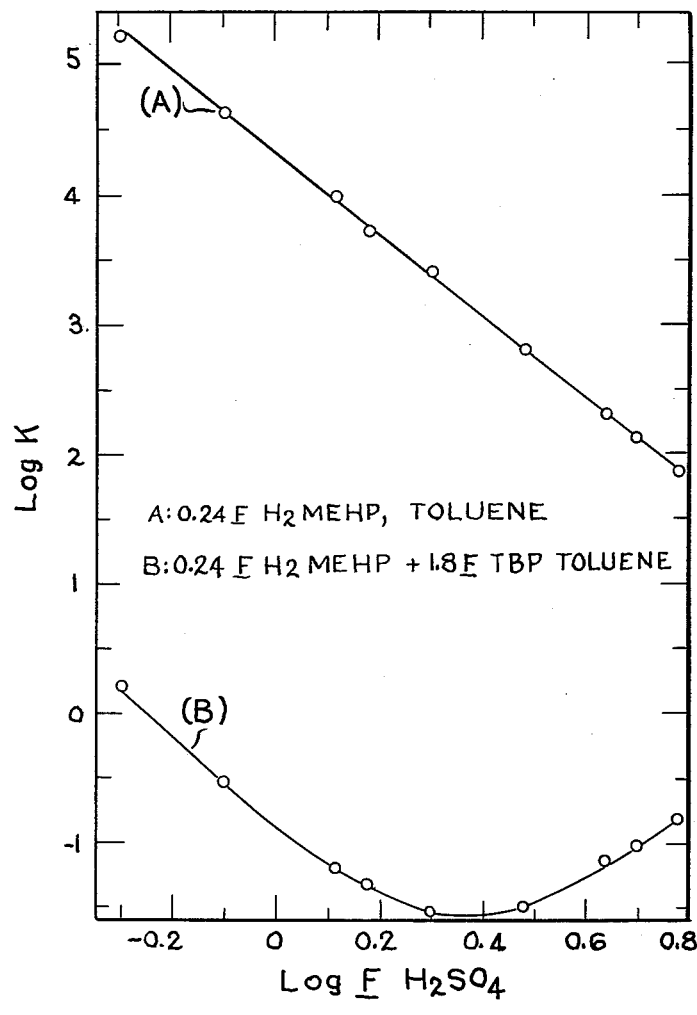
Figure 6:
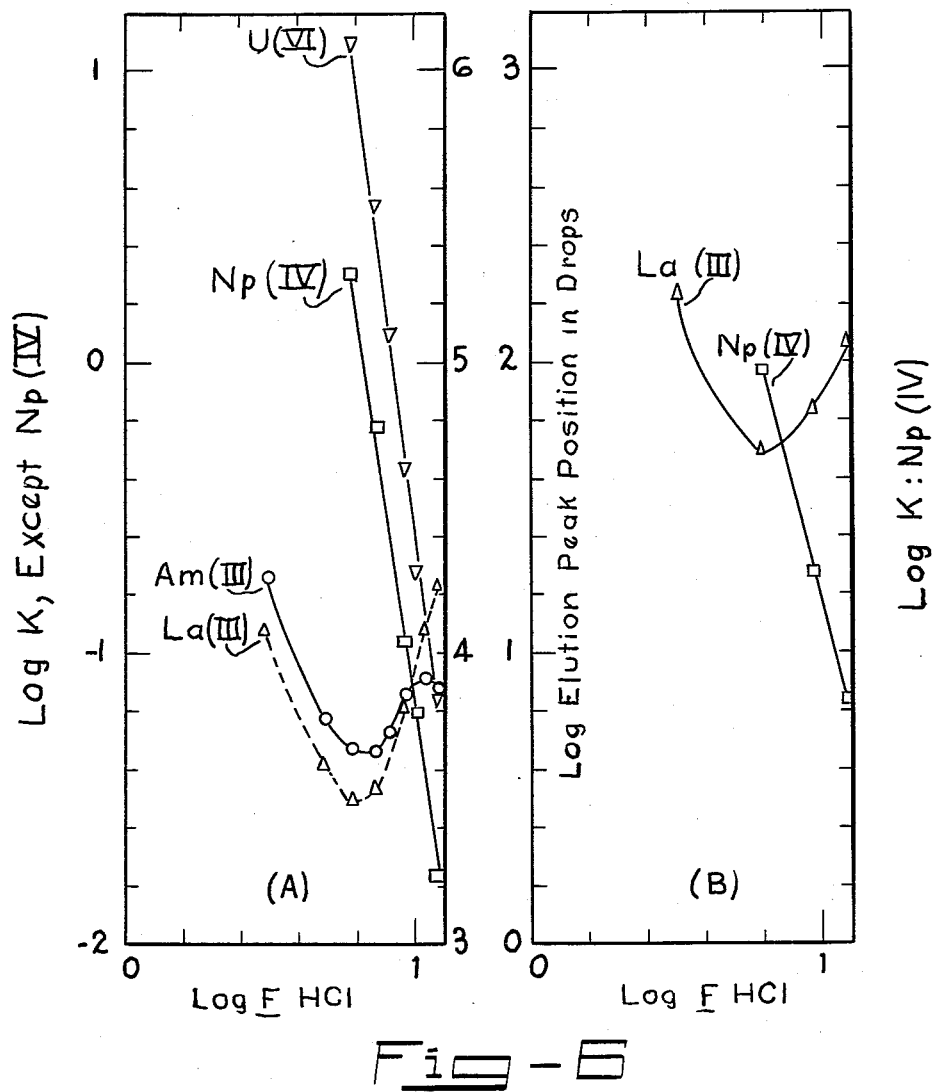

Oct. 17, 1961  D. F. PEPPARD ET AL  3,004,823
METHOD OF SEPARATION NEPTUNIUM BY LIQUID-LIQUID EXTRACTION
Filed July 15, 1959  6 Sheets-Sheet 1
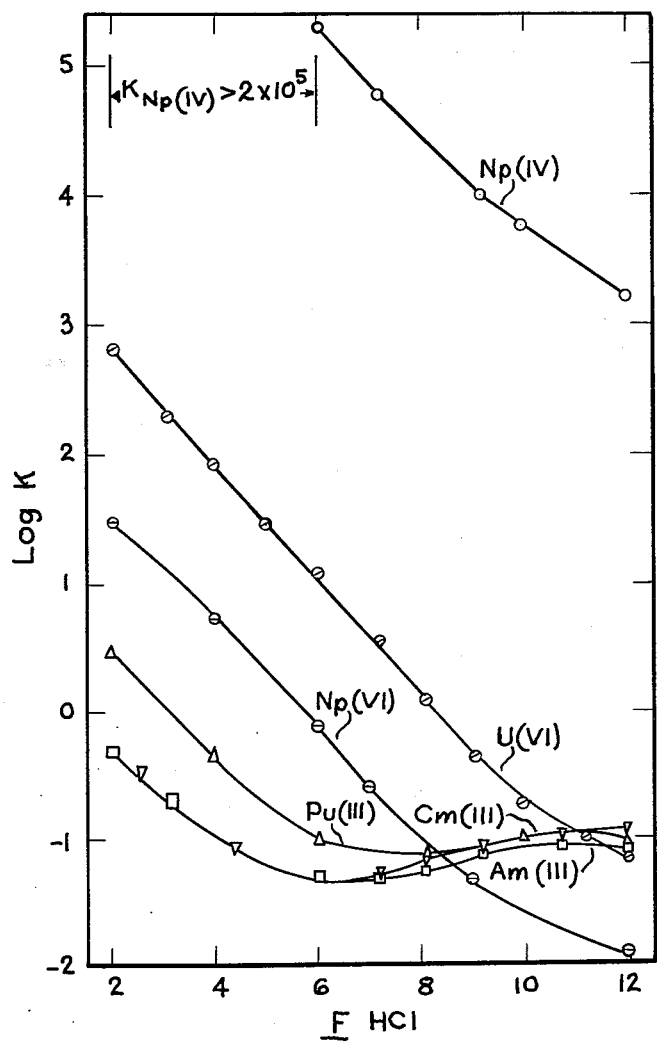
INVENTORS
Donald F. Peppard
George W. Mason

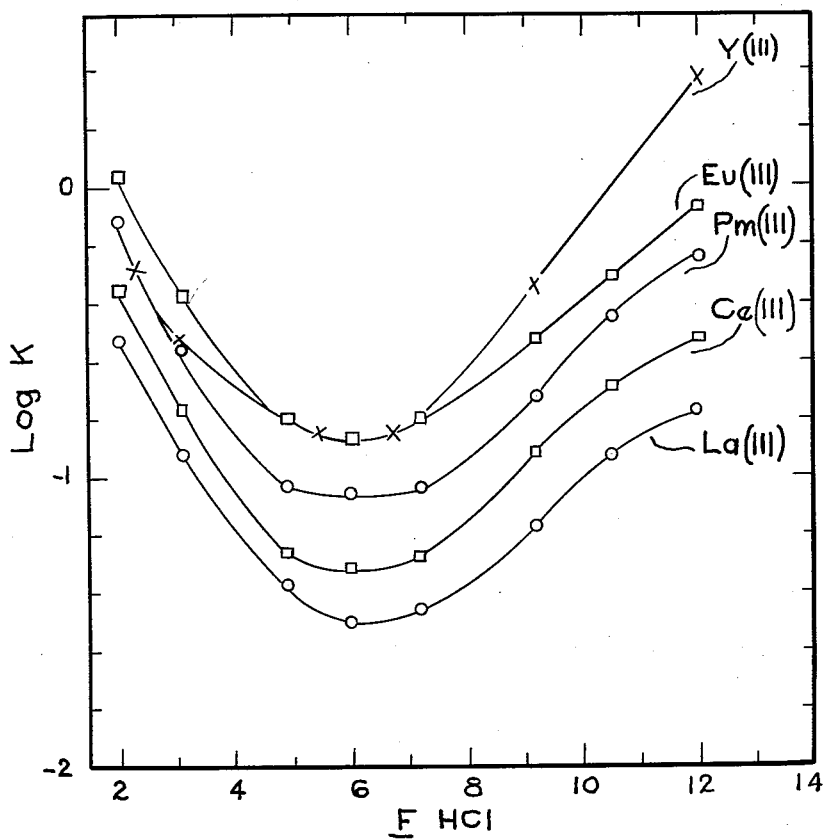

EXTRACTION OF SELECTED ACTINIDE AND LANTHANIDE (AND YTTRIUM) CATIONS FROM 6 F HCl AS A FUNCTION OF $H_2$MEHP (TOLUENE) CONCENTRATION.

EXTRACTION OF SELECTED ACTINIDE AND LANTHANIDE (AND YTTRIUM) CATIONS FROM 12 F HCl AS A FUNCTION OF H₂MEHP (TOLUENE) CONCENTRATION.

3,004,823
METHOD OF SEPARATING NEPTUNIUM BY LIQUID-LIQUID EXTRACTION
Donald F. Peppard, Oak Park, and George W. Mason, Clarendon Hills, Ill., assignors to the United States of America as represented by the United States Atomic Energy Commission
Filed July 15, 1959, Ser. No. 827,410
4 Claims. (Cl. 23—14.5)

This invention relates to a novel method of separating actinide values from aqueous solutions, particularly neptunium values from radioactive solutions resulting from the operation of neutronically activated nuclear reactors.

In the present state of the art, nuclear reactors cannot be operated indefinitely, but must be shut down periodically for "renewal" due to "fuel burn-up" as it is called, but which is not so much due to actual depletion of the fissionable fuel as to a combination of other considerations. Among these are the thermal distortion of the fuel slugs which causes them to exert pressure on the aluminum or zirconium "cans" in which they are confined, with a consequent danger of leakage and release of dangerous fission products, a build-up of gaseous pressure within the cans by gaseous fission products such as xenon, and the accumulation of certain fission products with large thermal neutron absorption cross-sections, which tends to interfere with, or "poison," the nuclear reaction.

When these processes have gone far enough to make a shut-down necessary the "core" of the reactor, consisting of the fuel elements, their protective cladding or "cans," and even a substantial part of the structural members holding them in place in some cases, are removed by remote manipulation behind heavy shielding, and after a lapse of several weeks to permit the extremely dangerous short-lived radiation to decay, the core is dissolved in an aqueous strong mineral acid, nitric acid being most commonly employed for the purpose at the present time. This results in a solution in which, after the anions of the dissolving acid, the cations from the structural metal such as aluminum or zirconium are ordinarily present in largest numbers, followed by the uranium ions from the undepleted fuel, and then in smaller amounts, the cations and anions of the various fission products, and the cations from the transmutation products of the reaction, the transuranic elements neptunium, plutonium, and americium. In an oxidizing acid such as nitric acid uranium and some of the other actinide elements will, of course, be present in hexavalent form.

While solutions of this kind are hazardous and troublesome to dispose of, they are at the same time very valuable due to their large content of fissionable material, uranium and plutonium, which must be recovered if nuclear reactors are to be operated with any view to economic success. In addition, many of the fission products have value as sources of beta and gamma radiation for food irradiation, thickness testing and the like, and the transmutation product neptunium 237 has potential value as a source of alpha radiation for such purposes as calibrating alpha counters and in neutron sources. Neptunium 237 has a half-life of $2.2 \times 10^6$ years so that, unlike its isotope neptunium 239, it does not decay so rapidly as to rule out in advance the possibility of its separation in appreciable quantities.

However, up until the present time no really satisfactory method for isolating neptunium has been found. The only method presently in use is a chemical one requiring repeated oxidations by bromate ion in aqueous solution, followed by repeated filtrations and recycling. Even though this method eventually yields neptunium in fairly good quantity, the many transfers of the radioactive, highly toxic solutions between vessels add to the hazard as well as to the expense of the process. All such operations have to be carried out by remote manipulation or in "glove boxes" in an inert atmosphere, under negative pressure with respect to the outside atmosphere so that all gas leaks shall be inward rather than outward. It is therefore apparent that any process requiring fewer manipulations or less time to carry out is extremely useful.

Because of this fact classical chemical processes of separation by precipitation and filtration have been largely supplanted in the nuclear art by solvent extraction methods, or as they are also called, liquid-liquid extraction methods. In any event, in these methods an organic liquid essentially immiscible with water is brought into contact with the aqueous solution so as to form two phases, whereupon the various components of the solution diffuse back and forth across the interface of the phases at different rates so as to reach an equilibrium of concentrations between them. For any given component of the solution the equilibrium constant "K," or distribution ratio as it is also called, may be expressed mathematically as follows:

$$K = \frac{[\text{Concentration of component in organic phase}]}{[\text{Concentration of component in aqueous phase}]}$$

If it is desired to predict the behavior of two components in a solution when brought into contact with a certain organic liquid, or extracting solvent, all that need be known is the equilibrium constant, or distribution ratio of each whereupon the ratio of the two individual constants will yield the separation factor, $\beta$, of the overall solvent extraction process, the initial concentrations being equal. If these are not equal, appropriate adjustment may be made as shown below; calling the two components Component 1 and Component 2, the situation may be expressed mathematically:

$$\beta = \frac{\text{K of Component 1}}{\text{K of Component 2}}$$

From the foregoing, it is apparent that the efficiency of any solvent extraction process is dependent on the size of "$\beta$" separation factor. If this "$\beta$" is only slightly greater than unity Component 1 can be separated from Component 2, but only by repeated contacts and "scrubbings" or "back extractions" following each contact; as "$\beta$" increases the number of required contacts decreases, and when "$\beta$" becomes large enough, a single contact will suffice. In the handling of the kind of solutions with which the present invention is concerned the discovery of processes requiring only a few, or best of all, only one contact is obviously desirable; any increase in efficiency, for the safety and expense reasons above pointed out, is of real significance in this field of endeavor.

Another aspect of nuclear waste solvent extraction methods that should be mentioned is that they have to be carried out at very great dilutions. This is not only for safety reasons, but also because at higher concentrations of the radioactive components the radiation effects upon the solvent become strong enough to lead to its chemical decomposition. This, in turn, leads to emulsification between the organic and the aqueous phases, particularly when they are shaken or otherwise agitated together, as must be done if the process is to be carried out in a reasonable length of time; furtherfore, the decomposition mentioned changes the "K's" above referred to, thereby further impairing the efficiency of the process. The great drawback to the use of high dilutions, however, becomes apparent when it is recalled that practically all presently known solvent extraction methods require a "salting-out agent," either sodium nitrate, nitric acid, or the like in IV oxidation state as will be explained in detail herein, and at the same time neptunium displays under certain conditions a tendency to go into the oxidation state mentioned, differing in this respect from its actinide neighbors uranium, plutonium, americium, and curium, and thereby supplying a powerful method for its separation from them. Our extraction process has a separation factor varying somewhat at different pH and other concentration conditions but its order of magnitude is always strikingly large. Furthermore, we have found that after the extraction has been completed, the distribution ratio may be rapidly reduced by a factor of as much as five orders of magnitude by adding an anti-synergistic agent, tri-butyl phosphate, whereby the back-extraction of the neptunium values can be carried out with a minimum volume of aqueous scrubbing solution. Finally, we have discovered that in order to eliminate the need for a salting-out agent to make the extraction efficient, the extraction should be in a system other than a nitrate anion system; a system where the predominant anion is sulphate gives acceptable results, but a chloride ion system is preferred. This last aspect of our discovery not only applies to extractions of neptunium values, but to all actinide values as well; $H_2MEHP$'s selective behavior toward neptunium is shown toward the other actinides, so that the invention may be used for their extraction, although the extraction constant will be smaller in those applications.

Of course, most reactor waste solutions now requiring treatment are a nitrate type of solution, but when this is the case, the part of our invention dispensing with the salting-out agent may still be carried out with a slight modification; several contacts must first be made between the aqueous and the organic solutions and the organic phases contacted with portions of a scrub containing strong hydrochloric acid until the nitrate content of the organic extract becomes negligible; it is much easier, of course, when the original mineral acid solvent for the reactor core is hydrochloric acid and it is our expectation that its use for this purpose may increase once the benefits of the present invention become known.

Our invention is carried out at an acid formular normality of from about 5 to about 13, the choice of normality depending on what components are originally in the solution to be separated as will now be explained by referring to the graphs which supply the information necessary for putting our invention into practice. Since all the graphs have as ordinates common logarithmic values of distribution ratios and since as was explained above, the separation fractor, β, between any two components is the ratio of the two "K's" or distribution ratios, this may be found on the logarithmic graph simply by subtracting one "log K" from another. For example, to determine the separation factor between neptunium in the +4 oxidation state and plutonium in the +3 oxidation state all that need be done is to consult FIG. 1; at 6 F HCl, the log K for the former is about +5.25, and the log K for the latter is about −1; thus the separation factor at this acid molarity is about $10^{6.25}$. In other words, assuming the concentrations of both components to be equal, after contacting an aqueous solution of these two components with 0.48 F $H_2MEHP$ with respect to toluene, there will be $10^{6.25}$ or about one million times as much neptunium IV in the organic phase as plutonium in III, after equilibrium has been reached. If the concentrations of the two components are not equal initially the final outcome will, of course, be affected proportionally. From this it can be seen that it is highly desirable that the distribution ratio "K" be very large so that if the concentration of the extracted component is small compared to that of the other component, efficient extraction may still take place. By using these graphs many different separation factors between different components may be determined, and schemes for separating a great variety of complex solutions laid out by applying the simple techniques above outlined.

With this information in mind, the invention may then be carried out. First of all, the solution to be treated is brought within the acidity range of 5–13 F mentioned, preferably to a point within the range to take advantage of the various maxima and minima shown in the curves of the graphs. For example, if the solution contains curium or americium III from which it is desired to separate uranium VI, it is obvious that this separation will succeed at 6 F where the curves are far apart, but fail at 11 F where they cross; if curium and americium III are to be separated from neptunium IV, the separation will succeed at either 6 F or 12 F, but if there is nothing else present to complicate the matter the better choice is 6 F in order to take advantage of the minima in the curium III and americium III curves at that normality. The optimum acidity being thus determined by consulting the graphs, the entire solution is treated with an oxidizing agent the purpose of which is to raise the neptunium and uranium components to their highest oxidation state, i.e. neptunium VI and uranium VI. Plutonium is then selectively reduced to plutonium III in order that the data represented by curves on the graphs may be applied as indicated. The oxidizing agents need not be added in strictest stoichiometric proportions, but they should not be added carelessly as grossly excessive amounts necessarily complicate the situation. Many oxidizing agents may be used, bromate ion, nitric acid, permanganate ion, dichromate ion, or any other oxidizing agent, bromate ion being preferred. Stoichiometric proportions should at least be approximated and then a slight excess added in order to insure oxidation of neptunium and uranium to their VI oxidation state. Next, reducing agents should be added in the same general proportions; of course, enough should be added to overcome any excess oxidizing agents in the solution, in addition to other requirements. Many reducing agents, alone or in mixtures, are operative including hydroquinone, potassium iodide, hydrazine, hydrogen peroxide, aldehydes, such as formaldehyde and the like. We prefer, however, a mixture of hydroquinone and potassium iodide in the lower half of our preferred acidity range and hydroquinone alone in the upper half. It is probable that in this acidity range the hydrochloric acid has a reducing character and makes a contribution to the reducing action of the other reducing agent or agents. The reducing agent or agents are ordinarily added to the solution prior to extraction or, in special cases, it may be withheld from the initial solution and placed in the scrub solution in which case the reduction will take place within the organic phase and the desired separation factor will be reached as will be explained later.

When neptunium values are the ones being extracted, it is possible to add the reducing agent to both the initial solution and to the scrub solution as excess amounts are not harmful due to the strong tendency of this element to remain in the plus IV state. When values other than neptunium, such as uranium are being extracted, considerably more care is required not to use amounts of reducing agents in excess of the stoichiometric or the uranium VI will suffer reduction.

Figure 3:
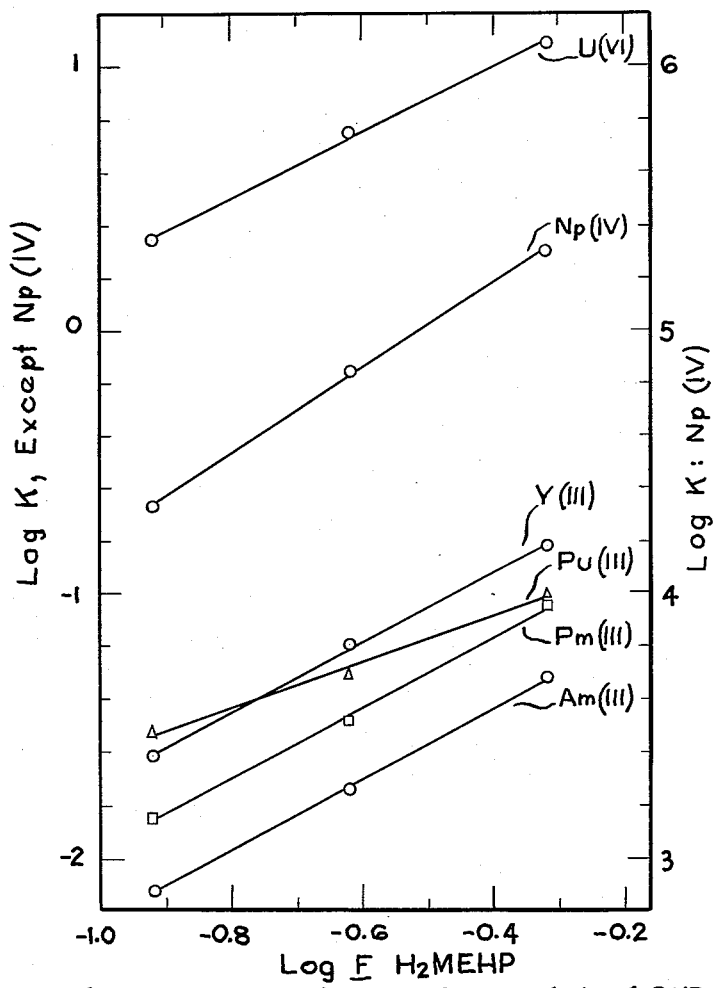
Figure 4:
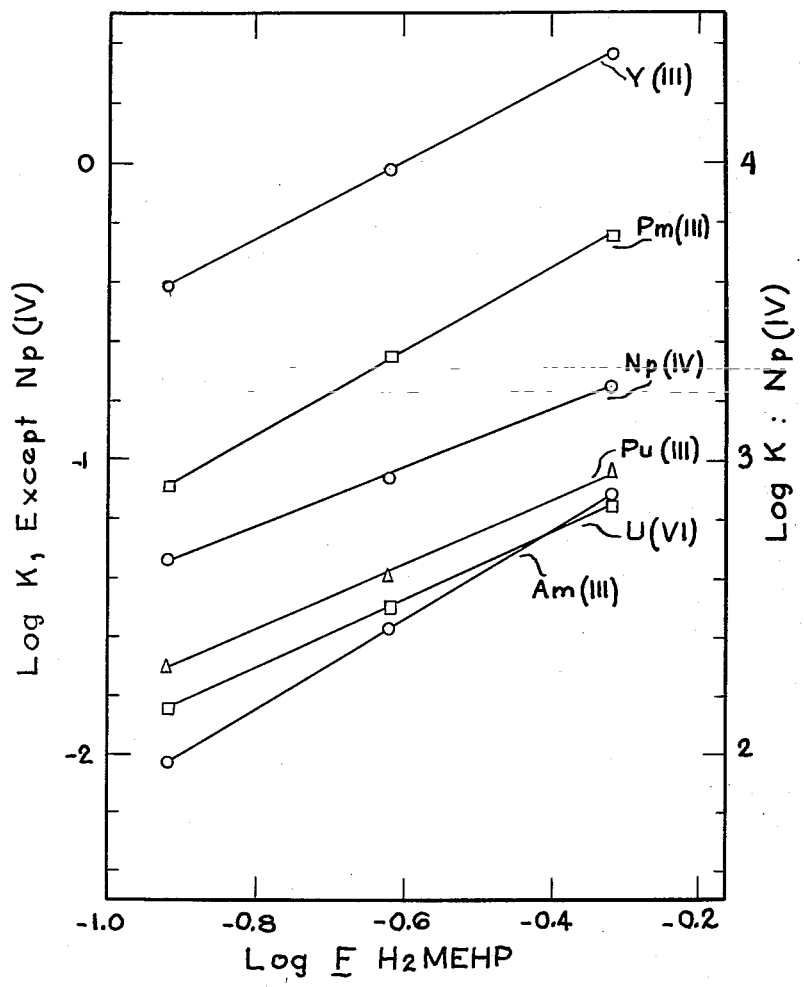

As we stated in the preceding paragraphs, ordinarily the oxidation step is followed by the selective reducing step and then the contact takes place between the two immiscible liquids in order to effect the extraction. The $H_2MEHP$ can be dissolved in any organic solvent that does not dissolve in water or interfere with the extraction such as, for example, by reducing one of the solution components; our preferred organic solvent is toluene. Benzene, hexane, petroleum ether and other hydrocarbons may also be used. The concentration of the $H_2MEHP$ in the organic solvent is not, as FIGS. 3 and 4 will show precisely critical; while the theoritical efficiency of the extraction appears to rise rather linearly as the concentration is reduced, as a practical matter, it becomes inconvenient to work with too small a concentration and we have found the concentration of 0.48 F to be a good compromise between theoretical efficiency and practical convenience, and designate it as our preferred concentration. Of course, in certain cases it would be advisable to decrease the concentration of the $H_2MEHP$ in order to avail oneself of a larger measure of the theoretical efficiency; on the other hand, the concentration might well be increased if the amount of material to be extracted is large. In any case, the graph of FIG. 3 will serve as a guide to determine the upper or lower limits of such increases or decreases.

The manner of contact may be determined by the well-known principles of chemical engineering; shaking the two immiscible liquids together in a separatory funnel is convenient on a small scale, although on a large scale contact columns are preferable.

An explanation will now be given of the special cases mentioned above, of where the reducing step need not be carried out prior to the contact. If all the initial components of the aqueous solution have a high distribution ratio in their high oxidation state, they may be extracted by the organic liquid as soon as the oxidizing step is complete; then, when a reducing scrub solution is applied the more easily reduced components will reduce and go back into the aqueous solution, according to their individual distribution ratios. Thus, in cases where all these conditions hold it is, in effect, optional to do the reducing before or after the contact between the two liquids. However, if any of the above conditions are not met the reducing step obviously must precede the contact; if, for example, a component whose extraction is desired has a high "K" in the reduced state, but a low "K" in the oxidized state, no extraction will take place unless the reducing step precedes the extraction. The cases are varied, but regardless of what the components may be, their behavior may be easily forecast by the graphs in the figures, and the order of the steps in carrying out the process determined accordingly.

Finally, the extraction into the organic liquid having been made, the removal of the desired components therefrom is next in order. Although it is possible to scrub out any component from any organic liquid by using unlimited quantities of distilled water, it is, as is explained above, desirable for safety reasons in handling nuclear reactor waste solutions or other actinide containing solutions, that the amount of scrub solution be kept as low as possible. We have discovered an additional property of $H_2MEHP$ that is of great use in this respect; as will be seen by referring to FIG. 5, the distribution ratio of neptunium IV can be reduced by about three to nearly five orders of magnitude by the addition of tributyl phosphate, or TBP, which acts as an anti-synergistic agent in the extraction of neptunium IV by $H_2MEHP$ in toluene, and thereby causes it to leave the toluene and return to the aqueous phase. Since, as was stated above, the theoretical efficiency of the extraction increases as the formular normality of the $H_2MEHP$ decreases, our graph showing the operation of the anti-synergistic agent when the $H_2MEHP$ is 0.24 F is to be regarded as a demonstration of its efficiency under unusually rigorous conditions; at our preferred concentration of 0.48 F for the $H_2MEHP$ the anti-synergistic agent would have only about half as great an extraction force to overcome. As the graph further indicates, all that need to be done to carry out our discovery is to add the TBP preferably at about 1.8 N in the organic solution, and dilute the aqueous solution sufficiently to bring it down to the acid normality indicated, preferably to about 0.38 F where the distribution ratio of the lower curve is at a minimum. The anti-synergistic effect of TBP in extracting components other than neptunium IV is not always so great as that shown by FIG. 5, but still quite pronounced so as to enable the amount of scrubbing liquid to be substantially reduced.

In certain cases, such as in Example III which will be set forth later, it is advisable to scrub with an oxidizing solution in between "reducing" scrubs. The purpose of this is to reoxidize to the VI state any uranium which may have been reduced in the "reducing" steps.

EXAMPLE I

A simulated nuclear reactor waste solution was made up containing actinide components in too small concentrations to be easily determined by chemical methods, but by decomposition counting found to contain the following:

$2 \times 10^3$ c./m. (counts per minute) of neptunium 237
$10^7$ c./m. plutonium 239 and americium
$10^6$ c./m. each of promethium 147, europium 192, europium 154, and yttrium 91

The solution (1 ml.) was acidified by adding HCl until it was 6 F in that acid, resulting in a volume of 2 ml., and then selectively reduced by adding 22 mg. of hydroquinone in the solid state and then contacted in a separatory funnel with about 2 ml. of 0.48 F $H_2MEHP$ in toluene. The immiscible liquids were shaken together in the funnel for about 3 minutes and then permitted to settle into two phases; the lower phase was drained off and the upper phase was scrubbed by shaking in the funnel for about 3 minutes with 2 ml. of an aqueous solution of 6 F HCl and 0.1 F hydroquinone; the solution was permitted to separate into phases and the lower phase drained off and the scrubbing process was repeated three more times, or a total of four scrubbings the third scrub being made by a fresh scrubbing solution which was also used for the fourth scrub. The neptunium was removed from the organic phase by adding an equal volume of 1.8 F TBP in toluene and back-extracting with a solution of 2 F $H_2SO_4$; the lower phase was permitted to separate, drained off and an aliquot evaporated on a platinum disc. The disc was placed in an alpha counter for assay which showed a neptunium 237 count (calculated for total re-extract) of $1.88 \times 10^3$ c./m., indicating a 95% recovery. A combination of alpha counting and beta counting also indicated the following decontamination factors:

$10^5$ for plutonium
$10^4$ for promethium, europium, and yttrium.

EXAMPLE II

The above experiment was repeated except that the "scrubs" immediately after the extractions were made with a solution of 12 F HCl and 0.1 F hydroquinone and reduced to two in number, and with the second scrub being a fresh one; while the recovery of neptunium remained about the same the decontamination factor for plutonium was reduced to about $10^3$ and for uranium to about 200.

EXAMPLE III 250 ml. of an actual nuclear reactor waste solution resulting from the dissolution of the spent reactor core in nitric acid was essentially 0.75 M $Al(NO_3)_3$, 1 M $HNO_3$, 0.0143 M $UO_2(NO_3)_2$ and 0.00557 M $PuO_2(NO_3)_2$. The neptunium content, while too small to measure by chemical means, was shown by a counter to consist of neptunium 237 present in a ratio (in terms of alpha activity) with respect to the Pu of $5 \times 10^{-5}$ to 1, or, in terms of solution molarity, of about $2,785 \times 10^{-7}$ M. The actinide components of this solution were reduced selectively by making the solution 0.1 M in hydroquinone and 0.1 M in potassium iodide and allowing to stand for 10 minutes. The selectively reduced solution was then contacted for a 3 minute period, with a 25 ml. portion of 0.48 F $H_2MEHP$ in toluene, and the lower, aqueous phase was drained off, and again contacted with another 25 ml. portion of a similar organic solution and the aqueous phase drained off. The two 25-ml. organic phases were then combined in a single separatory funnel to form a single phase of about 50 ml. which was then contacted for about 3 minute periods with six 50-ml. portions of freshly prepared aqueous scrub solution 12 M in HCl and 0.1 M in hydroquinone, the extract being transferred to a fresh contactor following the second and fourth scrubs, and contacted for a 5 minute period with a 50 ml. portion of freshly prepared oxidizing solution, 1 M in HCl and 0.2 M in potassium bromate, preceding the third and fifth scrubs respectively. Samples of the extract were evaporated and analyzed by counting by alpha pulse analysis to determine the neptunium 237: plutonium 239 ratio. Table I shows the results:

Table I.—Isolation of $Np^{237}$ from a process material

[Feed.—250 ml. of aqueous $HNO_3$ containing approximately 550 mg. $Pu^{239}$, 2.5 mg. $Np^{237}$, and 1,500 mg. $U^{238}$. Reduced feed extracted with two 25-ml. portions of 0.48 F $H^2MEHP$ (toluene diluent). Extract scrubbed with 6 50-ml. portions of 12 M HCl+0.1 M hydroquinone. Extract sampled after initial extraction and following scrubs as X-1, X-2, etc. Yield of $Np^{237}$ in excess of 95%]

| Composition | Extract | | | | | |
|---|---|---|---|---|---|---|
| | Feed | X-1 | X-3 | X-5 | X-6 | X-7 |
| Total alpha (c./m.) | $4 \times 10^{10}$ | $1.7 \times 10^{10}$ | $7.7 \times 10^8$ | $3.8 \times 10^6$ | $2.0 \times 10^6$ | $1.9 \times 10^6$ |
| $Np^{237}/Pu^{239}$) act. | $5 \times 10^{-5}$ | | <0.01 | 0.7 | 9 | >50 |
| $Np^{237}/U^{238}$) mass | $<2 \times 10^{-3}$ | | | | | >250 |

NOTE.—Extract transferred to a fresh contactor following second and fourth scrubs. Product DF with respect to $Pu^{239}$ and $U^{238}$, respectively: $>1 \times 10^6$ and $>1 \times 10^5$.

What is claimed is:

1. A method of separating neptunium chloride from a common solution containing the chlorides of plutonium, americium, promethium, europium and yttrium, comprising adding hydrochloric acid to the solution to a molarity of 6, bringing the aqueous solution into contact with a second solution of 0.48 F mono(2-ethylhexyl)orthophosphoric acid in toluene, agitating the two solutions together, then permitting them to separate into discrete phases then draining the lower aqueous solution away, then scrubbing the second solution with a scrub solution of 6 M in hydrochloric acid and 0.1 M in hydroquinone, thereby separating the neptunium values from the plutonium values by a separation factor of about ten to the sixth power.

2. The method of separating neptunium values from a nuclear reactor waste solution of 1 M nitric acid concentration comprising adding 0.1 M hydroquinone and 0.1 M potassium iodide and then allowing the solution to stand for about 10 minutes; then bringing the solution into contact with a second solution of 0.48 F mono(2-ethylhexyl)orthophosphoric acid in toluene in proportions by volume of about 10 of the aqueous solution to 1 of the second solution, then agitating the solutions together, then permitting them to separate into discrete phases and draining away the aqueous phase; then contacting the drained away aqueous phase with a fresh second portion of the second solution in the proportions mentioned, then agitating them together, permitting them to separate into discrete phases and draining away the aqueous phase; then pouring together the two portions of the second solution in a common container to make a combined second solution, and then contacting for about 3 minutes the combined second solution with an aqueous scrub solution 12 M in HCl and 0.1 M in hydroquinone, and then draining away the aqueous scrub solution, thereby separating the neptunium values from the plutonium values in the solution by a separation factor of about ten to the sixth power.

3. A method for separating Np IV values in an acidic aqueous solution with values of the group consisting of U VI, Pr III, Cm III, Am III, Y III, and lanthanide III, comprising bringing the aqueous solution into contact with a substantially immiscible organic liquid solution about 0.24 F in mono(2-ethylhexyl)orthophosphoric acid, agitating the two solutions together, discontinuing the agitation for a sufficient time to permit separation into a discrete aqueous phase and a discrete organic liquid phase, removing the organic liquid phase containing the preponderance of neptunium values from the aqueous phase, then adding tributyl phosphate to the organic liquid phase so as to make it about 1.8 F therein, then agitating the organic liquid phase with an acidic aqueous scrubbing solution, then discontinuing the agitation for a sufficient time to permit separation into a second discrete aqueous phase and a second discrete organic liquid phase, then removing the second aqueous phase containing a preponderance of the neptunium values from the second organic liquid phase.

4. A method for separating Np IV values in an aqueous solution containing values of the group consisting of U VI, Pr III, Cm III, Am III, Y III, and lanthanide III, comprising acidifying the aqueous solution by HCl between about 6 F and 12 F, then bringing the aqueous solution into contact with a substantially immiscible organic liquid solution containing mono(2-ethylhexyl)-orthophosphoric acid in a solvent, agitating the two solutions together, discontinuing the agitation for a sufficient time to permit separation into a discrete aqueous phase and a discrete organic liquid phase, and then removing the organic liquid phase containing the preponderance of the neptunium values from the aqueous phase.

References Cited in the file of this patent

UNITED STATES PATENTS

| | | |
|---|---|---|
| 2,683,655 | Peppard et al. | July 13, 1954 |
| 2,847,276 | Butler | Aug. 12, 1958 |
| 2,848,300 | Warf | Aug. 19, 1958 |
| 2,907,628 | Dawson | Oct. 6, 1959 |
| 2,945,742 | Christensen et al. | July 19, 1960 |

OTHER REFERENCES

ORNL 2346, pp. 3–9, April 1957, issued July 22, 1957.

Nuclear Science Abstracts, vol. 10, Abstract 3496, June 15, 1956, which reports UCRL 861, August 9, 1950, declassified December 7, 1955.

Katz et al.: "Chemistry of the Actinide Elements," pp. 209–211, 257, John Wiley and Sons, 1957.

ORNL 2346, ibid., pp. 12, 13.

ORNL 1903, pp. 99–108, 117–120, 123, 124, May 13, 1955, issued July 6, 1955.